United States Patent Office 3,355,427
Patented Nov. 28, 1967

3,355,427
POLYIMIDES OF A BIS-(TRIMELLITATE) DIANHYDRIDE AND A DIAMINE
Donald F. Loncrini, Schenectady, N.Y., assignor to General Electric Company, a corporation of New York
No Drawing. Filed Oct. 31, 1963, Ser. No. 320,556
24 Claims. (Cl. 260—47)

This invention relates to new and useful resinous compositions. More particularly, it relates to polyimide compositions and, more specifically, to polyester imides and polyamide imides and copolymers containing ester amide and imide groups which are particularly characterized by salutary physical qualities, including high temperature resistance.

There is at present a continual emphasis on improved high temperature characteristics for resinous materials created by the requirement that electrical and other equipment with which such resins are used must operate at higher and higher temperatures, thus requiring electrical insulation and other polymer structures which will withstand such temperatures.

A principal object, therefore, of this invention is to provide polyimide compositions, such as polyester imides, polyamide imides and copolymers containing ester, amide and imide groups which are particularly suited for operation as electrical insulation, protective coating materials, varnishes, adhesives, films, fibers and the like, which will withstand elevated temperatures and have other desirable properties.

The polymers of the present invention are conveniently prepared by reacting at room temperature under an inert atmosphere essentially equimolar parts of diamines and dianhydrides whereby soluble, high molecular weight, linear polyamide acid compositions are formed. Products of varying molecular weights can be obtained by varying somewhat the proportions of anhydride and amine. More than one anhydride and amine can also be utilized. The viscous solutions resulting from the reaction of the ingredients can be cast in the usual manner in the form of films, spun into fibers or prepared in other well-known forms. The polyamide acid material is then converted to the insoluble state by heat treatment at temperatures above 200° C. to yield tough, flexible, thermally stable products. The melting points of films so formed are generally above 440° C. and in many cases above 500° C. The films additionally are noninflammable and are useful as electrical insulation, tapes or in solution as wire enamels, varnishes, adhesives, and the like. The material may also be spun to form fibers which also possess the above desirable characteristics and cast or molded into desired structural parts.

The polymers of the present invention are made up of repeating units of amido, ester and imido units such as amido-amido-imido-imido-amido-amido-imido - imido or ester-ester-imido-imido-ester-ester-imido - imido. The copolymers of the invention may have all three linkages such as amido-amido-imido-imido-ester-ester groups and the like.

Those features of the invention which are believed to be patentable are set forth with particularly in the claims appended hereto. The invention will, however, be better understood and further advantages and objects thereof appreciated from a consideration of the following description.

The polyanhydrides which have been found particularly useful in conjunction with the present invention are those described in copending patent application S.N. 190,807, filed Apr. 27, 1962, now patent 3,182,073 assigned to the same assignee as this invention, said application being included by reference herein. These polyanhydrides conform to the following general formula:

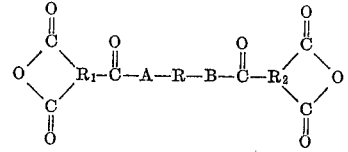

in which A can be oxygen, NH, sulfur, and the like; B can be the same as A or different within the above definition; R can be a di-, tri- and other polyfunctional aromatic, alicyclic, saturated or unsaturated aliphatic or a heterocyclic radical which can be either unsubstituted or substituted with other groups, such as halogen, nitro, keto, and the like. Exemplary of the aromatic radicals are those selected from the group having the following formulas:

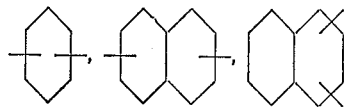

etc. where Y represents a divalent radical selected from the group consisting of:

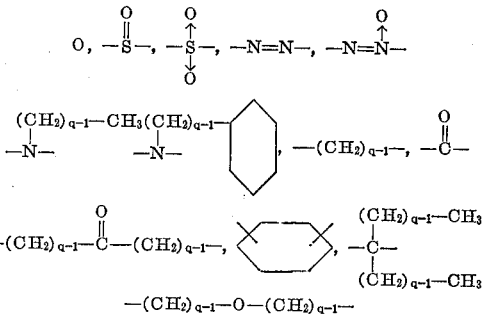

etc. where $q$ is a positive integer of from 1 to 15. When R is a trifunctional aromatic, it can be represented by the following formula:

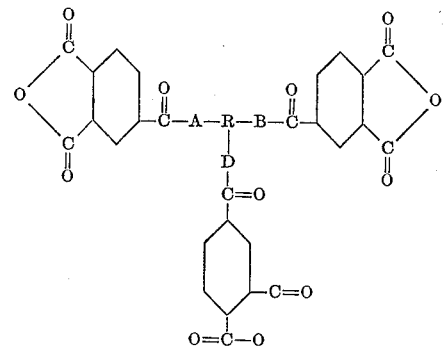

where B can be the same as A and D can be the same as A or B or these constituents can vary in any combination desired.

Among the aromatic radicals which are so useful are the divalent radicals of hydroquinone; resorcinol; dihydroxy naphthalene; dihydroxy-biphenyl; 2,2-bis(p-hydroxyphenyl) propane; dihydroxybenzophenone; methyl hydroquinone; chlorohydroquinone; phloroglucinol; trihydroxy naphthalene; p-hydroxy aniline; diamino benzene; p-hydroxythiophenol, etc. In the alicyclic series, R can be the divalent radical derived from cyclohexane; cyclobutane, cyclopentane, and the like. In the aliphatic series R can be —(CH₂)q-1—, (CH₂)q-1—O—(CH₂)q-1—, —(CH₂)q-1—(CH—CH)p-1—(CH₂)q-1—, —(CH₂)q-1—(C≡C)p-1—(CH₂)q-1—, etc.

where $q$ is a positive integer from 1 to 15 and $p$ is a positive integer from 1 to 5, and is typified by the residue of ethylene glycol, diethylene glycol, polyethylene glycol, neopentyl glycol, 2,2-dibromo methyl-1,3-dihydroxy propane, 1,6-dihydroxyhexane, ethylene diamine, ethanol amine, glycerol, sugars, and the like. In the heterocyclic series, R can be the di-, tri- or polyvalent residue radicals of dihydroxy pyridine, dihydroxy carbazole, diamino pyridine, etc. R can also be a di- or polyvalent metal such as Fe, Cu, Zn, Al, alkaline earth, etc., organometallic,

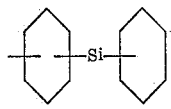

etc., R₁ and R₂ can be di-, tri- or polyfunctional aromatic radicals such as phenyl, naphthyl, phenanthryl, etc., or aliphatic radicals, such as propyl, butyl, pentyl, hexyl, octyl, decyl, etc., two of the carboxy groups being adjacent to form the anhydride.

Generally speaking, the anhydrides of the present invention can be readily prepared in well-known manner by an acidolysis reaction between one mole of tricarboxy acid or anhydride per equivalent of a compound containing a plurality of ester or amido groups or mixtures of such groups, preferably less than about six of such groups per molecule. This acidolysis reaction is unique in the sense that the reaction takes place on the No. 4 carboxylic acid position, thus, leaving the 1,2 positions intact. For example, in the case of trimellitic anhydride, only the free carboxylic acid group reacts leaving intact the anhydride linkage. If trimellitic acid is used, then the 1,2-dicarboxylic acid groups form the anhydride by splitting out one molecule of water before the transesterification reaction proceeds. In either case, the reaction products are the same. Among the other tribasic materials which can be used besides trimellitic anhydride or its acid are 1,2,4-naphthalene tricarboxylic acid, 1,4,8-naphthalene tricarboxylic acid, 1,2,4-butane tricarboxylic acid, 1,2,3-benzene tricarboxylic acid, 1,2,3-propane tricarboxylic acid and 2,3,6-naphthalene tricarboxylic acids or their corresponding anhydrides, among others. In preparing the anhydrides, equimolar parts of an ester or amide are reacted with one part of trimellitic anhydride, for example, or other tribasic material as described above either in the presence or absence of solvents and with or without catalysts of the transesterification type. Among the solvents which are useful in connection with the present invention are the chlorinated aromatic materials such as chlorinated diphenyl, diphenyl ether, etc. Among the transesterification catalysts which are well known to those skilled in the art are CaO, Ca, MgO, Mg, Li₂CO₃, H₂SO₄, HgSO₄, etc. Generally, reaction takes place in a temperature range of from about 125° C. to 300° C. and is complete when the theoretical amount of lower boiling acid has been removed by distillation. Normally, this takes place between 30 and 100 minutes. In general, any ester derivative of a hydroxy, amino, mercapto, etc., compound can be used in the transesterification reaction such as formate, acetate, propionate, butyrate, benzoate, and the like. The corresponding amides can also be used. However, from the point of view of convenience and economy of raw materials, the acetates are preferred. It will be realized, of course, that when the ester or amide, for example, is of such low boiling point that reaction does not take place, other suitable derivatives should be used.

Any aromatic, aliphatic, alicyclic or heterocyclic primary diamines are useful in conjunction with the present invention so long as they contain no other readily reactive groups besides amino groups which substantially detract from the polyester-producing reaction. Included among such diamines, but not limiting in any way, are benzidine; 4,4'-diamino diphenyl ether; p-phenylene diamine; 3,3'-dimethoxy-4,4'-diamino diphenyl-4,4'-diamino diphenyl methane; metaphenylene diamine; 4,4'-diamino diphenyl sulfone; 1,6-diamino hexane and ethylene diamine.

The polymerizations of the present invention are carried out in the presence of polar solvents which are illustrated by N-methyl pyrrolidone, dimethylformamide, dimethylacetamide, cresols such as meta-cresol, pyridine and dimethylsulfoxide alone or in mixture or with non-polar diluents such as benzene, and the like, so long as the solvent system is essentially polar.

The following examples will illustrate the practice of the present invention, and they are not to be taken as limiting in any way.

EXAMPLE 1

To 3.68 grams (0.020 mole) of benzidine dissolved in 100 cc. of dry dimethylformamide, there were added with stirring and with cooling 9.16 grams (0.020 mole) of p-phenylene - bis - (trimellitate) - dianhydride. The mixture after stirring for several minutes was further diluted with an additional 130 cc. of dimethylformamide and stirred under a blanket of nitrogen for three hours. The thick solution resulting had an inherent viscosity of 3.00 as measured in a 0.5% solution of dimethylformamide. Films were cast at room temperature on tin plates from this solution, dried at 40° C. in a final forced draft oven and heated to 200° C. for a period of 30 minutes. The tough, flexible films of the polyesterimide so prepared had melting points above 540° C. The p-phenylene-bis-(trimellitate)-dianhydride used in this example was prepared by heating with stirring 6 moles of trimellitic anhydride and 3 moles of p-phenylene diacetate for 100 minutes to a maximum temperature of 302° C., the acetic acid being distilled off as formed. It will be realized that the heat curing of the present materials is of a time-temperature nature. Generally speaking, a cure of about one hour at 200° C.–240° C. is adequate.

EXAMPLE 2

Example 1 was repeated using 6.00 grams (0.030 mole) of 4,4'-diaminodiphenyl ether and 13.77 grams (0.030 mole) of p-phenylene-bis-(trimellitate)-dianhydride in 120 cc. of dimethylformamide. The resulting solution had an inherent viscosity of 0.70 as measured in a 0.5% solution of dimethylformamide. A film cast from this solution and heated at 200° C. for about one hour yielded a tough, flexible polyesterimide material having a melting point greater than 540° C.

EXAMPLE 3

Example 2 was repeated using as a solvent N-methyl pyrrolidone to give a polymer having an inherent viscosity of 1.00. The tensile strength at 23° C. was 15,000 p.s.i. and at 200° C., it was 6,300 p.s.i. The corresponding tensile moduli were 440,000 p.s.i. and 193,000 p.s.i. The percent elongation at 23° C. was 14% and at 200° C., it was 23%. A 20%, by weight, solution of the above material was coated on 40.3 mil copper wire using coating dies and the coated wire passed vertically through an oven 18 feet in height. The oven temperature ranged from 150° C. from the bottom to 350° C. from the top and the wire speed varied from 18 to 26 feet per minute. The polyacid-amide polyester was thermally converted to the polyester-imide during this process. A total of six coats was applied to the wire to give an overall film coating thickness of 0.002 inch. Wire so coated was tested for heat shock by prestretching a wire sample 15% and winding the wire so stretched on a conical mandrel having the diameter ranging from 0.7 to 10 times the diameter of the bare wire and having an apex angle of about 20°, removing the conical-shaped coil of wire from the mandrel and placing it in air-circulating oven at 200° C. for one hour and then taking the arithmetical average of 5 coils measured at the largest diameter at which cracking appears, this being expressed as the inside diameter of the coil times the diameter of the wire. The value so obtained was 3×.

The cut-through temperature of the coated wire was measured by placing two links of wire, one over the other, at an angle of 90° and placing a load of 1000 grams at the intersection of the two wires with the temperature gradually being raised to the cut-through temperature which is that temperature at which the coating is cut-through to provide electrical conduction between the wires. The temperatures so obtained in this instance were over 350° C.

The flexibility of the wire coating was determined by stretching the electrical conductor so coated to the extent of 25% of its original length and winding the wire so stretched about a stepped mandrel having diameters of one, two and three times the wire diameter. The coating, when examined under a magnification of 10 for surface defects, had no such defects at the 2× step.

The solvent resistance of the wire coating as measured in a 50% ethanol-50% toluene by volume solution was satisfactory after boiling for 10 minutes.

EXAMPLE 4

To 9.16 grams (0.020 mole) of p-phenylene-bis-(trimellitate)-dianhydride dissolved in 125 cc. of dry dimethylformamide, there were added 2.16 grams (0.020 mole) of p-phenylene diamine. The mixture, blanketed with nitrogen, was stirred and cooled externally for two hours to provide a solution having an inherent viscosity of 1.24 as measured in a 0.5% solution of dimethylformamide. The reaction product was a tough, flexible cast film after heating at 200° C. for about one hour which melted at more than 540° C. At 23° C., the tensile strength and tensile modulus were 16,800 p.s.i. and 1,310,000 p.s.i. while at 200° C., they were 11,300 p.s.i. and 549,000 p.s.i. The corresponding elongations were 5% at 23° C. and 16% at 200° C.

EXAMPLE 5

Example 3 was repeated using as the solvent N-methyl pyrrolidone to provide a material having an inherent viscosity of 2.80 as measured in a 0.5% solution of dimethylformamide.

EXAMPLE 6

Example 1 was repeated except there were added to a mixture of 1.74 grams (0.0071 mole) of 3,3'-dimethoxy-4,4'-diamino biphenyl and 3.26 grams (0.0071 mole) of p-phenylene-bis-(trimellitate)-dianhydride with stirring and external cooling, 45 grams of N-methyl pyrrolidone, the mixture being stirred at two hours under an atmosphere of nitrogen. The resulting solution had an inherent viscosity of 1.04 as measured in a 0.5% solution of dimethylformamide. Tough, flexible films were cast from solutions of this material, such films having melting points greater than 540° C. after heating as in Example 4.

EXAMPLE 7

Example 6 was repeated using dimethylformamide as a solvent in lieu of N-methyl pyrrolidone. The resulting polymer had an inherent viscosity of 0.86 as measured in a 0.5% solution of dimethylformamide.

EXAMPLE 8

Example 1 was repeated by adding to a solution of 1.51 grams (0.0076 mole) of 4,4'-diaminodiphenylmethane in 95 grams of meta-cresol with rapid stirring and external cooling, 3.49 grams (0.0076 mole) of p-phenylene-bis-(trimellitate)-dianhydride. The solution resulting after two hours of stirring under an atmosphere of nitrogen had an inherent viscosity of 0.81 as measured in a 0.5% solution of dimethylformamide. When cast into a tough, flexible film, the melting point of the film was over 540° C. after heating to about 200° C. for about one hour. Since cresol is an excellent solvent for enamels, the cresol solution of the product can be used directly or modified to desired consistency for use as coatings on electrical conductors or other structures and cured in place.

EXAMPLE 9

To a solution of 10.68 grams (0.0995 mole) of distilled meta-phenylenediamine in 318 grams of N-methyl pyrrolidone, there were added with rapid stirring and external cooling 45.57 grams (0.0995 mole) of p-phenylene-bis(trimellitate)-dianhydride. After stirring for 3.5 hours under an atmosphere of nitrogen, the viscous polymer solution resulting had an inherent viscosity of 1.35 as measured in a 0.5% solution of dimethylformamide. Tough, flexible films were cast from this material, such films having a melting point, after heating as in Example 8, greater than 440° C. The 23° C. tensile strength was 15,800 p.s.i. while at 200° C., it was 6,500 p.s.i. with corresponding tensile moduli of 454,000 p.s.i. and 255,000 p.s.i. and elongations of 9% and 40%.

When the above material was prepared with a 10%, by weight, solution in N-methyl pyrrolidone and coated on nickel-plated copper wire having a diameter of 40.3 mils in a manner similar to that described in connection with Example 3 above, an insulation having very desirable insulating characteristics was obtained. The flexibility of the coating tested as in Example 3 above using a 25% stretch and a 3× mandrel was satisfactory. The solvent resistance tested in a similar manner was also satisfactory and the cut-through was over 350° C. The abrasion resistance measured by rubbing the side of a round needle to-and-fro over the insulating coating until it was worn away was 73 strokes. The material also passed the standard sudden stretch test satisfactorily.

EXAMPLE 10

Example 9 was repeated using dimethylformamide as a solvent to produce a polymer solution having an inherent viscosity of 0.94 in a 0.5% solution of dimethylformamide.

EXAMPLE 11

To a mixture of 1.76 grams (0.0071 mole) of 4,4'-diaminodiphenyl sulfone and 3.24 grams (0.0071 mole) of p-phenylene-bis-(trimellitate)-dianhydride, there were added under an atmosphere of nitrogen and with external cooling 95 grams of meta-cresol. After stirring for 71 minutes, the solution had an inherent viscosity of 0.45 as measured in a 0.5% solution of meta-cresol. The tough, flexible films cast from the solution had a melting point greater than 400° C. after curing as above.

EXAMPLE 12

There were added with rapid stirring to a mixture of 1.01 grams (0.0087 mole) of 1,6-diaminohexane and 3.99 grams (0.0087 mole) of p-phenylene-bis-(trimellitate)-dianhydride 45 grams of dimethylformamide with rapid stirring, the mixture being stirred further for six hours under a blanket of nitrogen. The resulting polymer had an inherent viscosity of over 0.3 in a solution of 0.5% dimethylformamide and films cast from the material had a softening point of over 360° C. when heated as above.

EXAMPLE 13

To 4.21 grams (0.0073 mole) of 2,2-bis-(p-trimellitoxyphenyl)propane dianhydride (made by reacting 2 parts of trimellitic anhydride with 1 part of 2,2-bis-(p-acetoxyphenyl)propane) and 0.79 gram (0.0073 mole) of para-phenylene diamine, there were added 45 grams of N-methyl pyrrolidone, the mixture being stirred vigorously under a blanket of nitrogen for several hours to produce a polyester having an inherent viscosity of 1.03 as measured in a 0.5% solution of N-methyl pyrrolidone. The polymer of this example had a softening range greater than 450° C. after heat curing as above.

EXAMPLE 14

To a solution of 0.57 gram (0.0096 mole) of ethylene diamine dissolved in 45 grams of N-methyl pyrrolidone, there were added with stirring and external cooling 4.421 grams (0.0096 mole) of p-phenylene-bis-(trimellitate)-dianhydride. The mixture was stirred under nitrogen for two hours to give a viscous polyester having an inherent viscosity of 0.41 as measured in a 0.5% solution of N-methyl pyrrolidone. The material can be cured to a high melting point product.

EXAMPLE 15

To a mixture of 3.95 grams (0.0096 mole) of 1,2-ethylene-bis-(trimellitate)-dianhydride and 1.05 grams (0.0097 mole) of para-phenylene diamine, there were added with stirring 45 grams of N-methyl pyrrolidone. The mixture was externally cooled and stirred under a nitrogen atmosphere for two hours to produce a polyester having an inherent viscosity of 0.26 as measured in 0.5% N-methyl pyrrolidone. The polymer can be heat-cured to produce a high melting point material.

EXAMPLE 16

To a solution of 7.44 grams (0.0087 mole) of pentaerythrityl-tetrakis-(trimellitate)-tetra anhydride (the reaction product of 4 parts of trimellitic anhydride and 1 part of pentaerythritol-tetraacetate) in 45 grams of N-methyl pyrrolidone, there was added with vigorous stirring a mixture of 0.94 gram (0.0087 mole) of paraphenylene diamine and 1.62 grams (0.0174 mole) of aniline. The mixture was stirred for about one hour with external cooling and under a blanket of nitrogen. An insoluble gel resulted which did not fuse at temperatures up to 500° C. when heat-cured as above.

EXAMPLE 17

N-methyl pyrrolidone in the amount of 45 grams was added to a mixture of 4.04 grams (0.0088 mole) of meta-phenylene - bis - (trimellitamide) - dianhydride and 0.96 gram (0.0088 mole) of para-phenylene diamine with stirring and external cooling under nitrogen, the stirring being continued for two hours to produce a polymer having an inherent viscosity of 0.2 in a 5% solution of N-methyl pyrrolidone. A heat-cured film of this polymer cast from solution had a melting range of over 540° C.

EXAMPLE 18

To 3.95 grams (0.0065 mole) of 1,2-ethylene bis-(trimellitamide)-dianhydride and 1.05 grams (0.0097 mole) of para-phenylene diamine, there were added with vigorous stirring 45 grams of N-methyl pyrrolidone. The mixture was stirred for three hours under a blanket of nitrogen with external cooling to produce a polymer having an inherent viscosity greater than 0.1 as measured in 0.5% N-methyl pyrrolidone. The softening range of the heat-cured material was over 400° C.

EXAMPLE 19

To a mixture of 4.06 grams (0.0088 mole) of p-phenylene-bis-(trimellitate)-dianhydride, 0.482 gram (0.0044 mole) of meta-phenylene diamine and 0.82 gram (0.0044 mole) of benzidine, there were added with rapid stirring and external cooling 45 grams of N-methyl pyrrolidone. The mixture after stirring for two hours under a nitrogen atmosphere produced a copolymer having an inherent viscosity of 1.45 as measured in a 0.5% solution of N-methyl pyrrolidone. A heat-cured film cast from this material had a melting point of over 540° C.

EXAMPLE 20

To a mixture of 22.9 grams (0.05 mole) of p-phenylene-bis-(trimellitate)-dianhydride and 9.9 grams (0.05 mole) of 4,4'-diaminodiphenylmethane, there were added with stirring 186 grams of N-methyl pyrrolidone. The mixture was externally cooled and stirred under a nitrogen atmosphere for two hours to produce a polyester polyacid-amide having an inherent viscosity of 0.82 as measured in 0.5% solution of N-methyl pyrrolidone. Tough, flexible films were cast from solutions of this material, such films having melting points greater than 400° C. when heat-cured as above. At 23° C. the film had a tensile strength of 14,500 p.s.i. and tensile moduli of 544,000 p.s.i. while these values at 200° C. were 6,160 p.s.i. and 191,000 p.s.i. The elongation at 23° C. was 6% and at 200° C. it was 21%.

EXAMPLE 21

To a mixture of 22.9 grams (0.05 mole) of p-phenylene-bis(trimellitate)-dianhydride, 4.6 grams (0.025 mole) of benzidine and 5.0 grams (0.025 mole) of 4,4'-diaminodiphenyl ether, there were added with rapid stirring 292 grams of N-methyl pyrrolidone. The mixture after stirring for one hour under a nitrogen atmosphere produced a polyester copolymer having an inherent viscosity of 0.78 as measured in a 0.5% solution of N-methyl pyrrolidone. Films cast from this material when heat-cured were tough, flexible and had a melting point of over 540° C. Film so cast had a 23° C. tensile strength of 22,700 p.s.i. and tensile modulus of 790,000 p.s.i. while at 200° C. the tensile strength was 9,900 p.s.i. and the tensile modulus 354,000 p.s.i. The corresponding elongations were 6% and 11%.

EXAMPLE 22

To a mixture of 5.76 grams (0.010 mole) of 2,2-bis-(p-trimellitoxyphenyl)-propane dianhydride and 2.0 grams (0.010 mole) of 4,4'-diaminodiphenyl ether were added with rapid stirring under a nitrogen atmosphere, 44 grams of N-methyl pyrrolidone. The mixture after stirring for one hour had an inherent viscosity of 0.35 as measured in a 0.5% solution of N-methyl pyrrolidone. Heat-cured films cast from this material were tough, flexible and had a melting point of 390° C. The 23° C. tensile strength was 9,860 p.s.i. and the tensile modulus 360,000 p.s.i. while the 200° C. tensile strength was 6,350 p.s.i. and the tensile modulus 152,000 p.s.i. The 23° C. elongation was 4% and the 200° C. elongation was 7%.

EXAMPLE 23

To a mixture of 1.84 grams (0.010 mole) of benzidine and 5.76 grams (0.010 mole) of 2,2-bis-(p-trimellitoxyphenyl)-propane dianhydride were added 43 grams of N-methyl pyrrolidone. The mixture was stirred vigorously for one hour under a nitrogen atmosphere. The viscous solution had an inherent viscosity of 0.41 and produced a tough, flexible polyester imide film upon casting and heating to 200° C. for a period of one hour. The melting point of this film was greater than 400° C. The 23° C. tensile strength was 13,400 p.s.i. and the tensile modulus 471,000 p.s.i. while the 200° C. tensile strength was 6,200 p.s.i. and the tensile modulus 208,000 p.s.i. The 23° C. elongation was 6% and the 200° C. elongation was 5%.

EXAMPLE 24

Forty grams of N-methyl pyrrolidone were added to a mixture composed of 2.0 grams (0.010 mole) of 4,4'-diaminodiphenyl ether; 2.89 grams (0.0050 mole) of p-phenylene-bis-(trimellitate)-dianhydride and 2.89 grams (0.0050 mole) of 2,2-bis-(p-trimellitoxyphenyl)-propane dianhydride. The mixture after stirring for one hour at room temperature under a nitrogen atmosphere yielded a viscous solution having an inherent viscosity of 0.37 as measured in a 0.5% solution of N-methyl pyrrolidone. Tough, flexible films were cast from this solution, such films having a melting point greater than 400° C. when heat-cured. The 23° C. tensile strength was 13,500 p.s.i. and the corresponding tensile modulus was 496,000 p.s.i. while the 200° C. tensile strength was 6,860 p.s.i. and the tensile modulus 214,000 p.s.i. The elongation at 23° C. and 200° C. was 5%.

EXAMPLE 25

To a mixture of 1.64 grams (0.010 mole) of 1,4-diamino-2,3,5,6-tetramethyl benzene (Durene diamine) and 4.58 grams (0.010 mole) of p-phenylene-bis-(trimellitate)-dianhydride were added with rapid stirring 56 grams of N-methyl pyrrolidone. The mixture after stirring for one hour under a nitrogen atmosphere had an inherent viscosity of 0.46 as measured in a 0.5% solution of N-methyl pyrrolidone. Cast heat-cured films of the material were tough and flexible and melted above 500° C.

EXAMPLE 26

To a mixture of 45.8 grams (0.1 mole) of p-phenylene-bis-(trimellitate)-dianhydride and 15.2 grams (0.1 mole) of 3,5-diamino benzoic acid were added 244 grams of N-methyl pyrrolidone. The mixture was stirred for one hour under a nitrogen atmosphere to yield a viscous solution having an inherent viscosity of 0.62 as measured in a 0.5% solution of N-methyl pyrrolidone.

The viscous solution was diluted with an additional 100 grams of N-methyl pyrrolidone and the dope was cast onto a glass panel using a doctor knife having an 18 mil opening. After evaporation of the solvent at 100° C. in an air-circulating oven, the film was heat treated at 200° C. for an additional two hours. A tough, flexible film was obtained having a melting point greater than 500° C.

EXAMPLE 27

To a mixture of 1.08 grams (0.010 mole of meta-phenylene diamine and 5.98 grams (0.010 mole) of 4,4'-di-(trimellitoxyphenyl)-sulfone dianhydride (made by reacting 2 parts of trimellitic anhydride with 1 part of 4,4'-diacetoxyphenyl sulfone) were added with stirring 63 grams of N-methyl pyrrolidone. The mixture after stirring for one hour at room temperature yielded a viscous solution having an inherent viscosity of 0.3 as measured in N-methyl pyrrolidone. The heat-cured polyester imide of this example had a softening point greater than 500° C.

EXAMPLE 28

To a mixture of 5.0 grams (0.025 mole) of 4,4'-diamino diphenyl ether and 13.36 grams (0.025 mole) of 2,2'-di-(trimellitoxy)-biphenyl dianhydride (made by reacting 2 parts of trimellitic anhydride with 1 part of 2,2'-diacetoxy biphenyl) were added with stirring 73 grams of N-methyl pyrrolidone. The mixture after stirring for one hour at room temperature had an inherent viscosity of 0.34 as measured in N-methyl pyrrolidone solution. Cast heat-cured films of this solution produced tough, flexible films having a melting range over 400° C.

There are provided, then, by the present invention polyimide materials which are particularly characterized by high temperature resistance. They are useful for making films, tapes and fibers and other useful structural forms can also be prepared from the present material. The compositions may be prepared in the form of varnishes and wire enamels which are characterized by excellent electrical characteristics as well as their ability to resist elevated temperatures. The present materials can also be filled with finely divided materials in the usual manner to prepare compositions having particular physical characteristics.

What I claim as new and desire to secure by Letters Patent of the United States is:

1. A dimethyl formamide insoluble imide group polymer consisting essentially of the reaction product of equimolar amounts of (1) at least one polyanhydride having the general formula

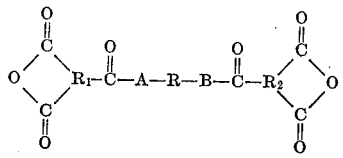

where A is selected from the group consisting of oxygen, NH and sulfur; B is selected from the group consisting of oxygen, NH and sulfur, R is a divalent organic radical containing at least two carbon atoms; $R_1$ and $R_2$ are selected from the group consisting of trivalent aromatic carbocyclic and saturated aliphatic hydrocarbon radicals, and (2) at least one organic primary diamine.

2. An insulated electrical conductor having as insulation a dimethyl formamide insoluble imide group polymer consisting essentially of equimolar amounts of (1) at least one polyanhydride having the general formula

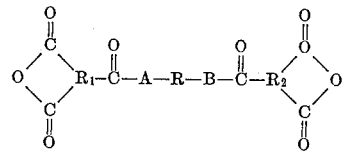

where A is selected from the group consisting of oxygen, NH and sulfur; B is selected from the group consisting of oxygen, NH and sulfur; R is a divalent organic radical containing at least two carbon atoms; $R_1$ and $R_2$ are selected from the group consisting of trivalent aromatic carbocyclic and saturated aliphatic hydrocarbon radicals, and (2) at least one organic primary diamine.

3. A dimethyl formamide insoluble imide group polymer obtained by (1) reacting in cresol essentially equimolar amounts of (a) at least one polyanhydride having the general formula

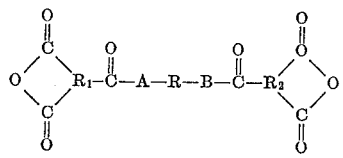

where A is selected from the group consisting of oxygen, NH and sulfur; B is selected from the group consisting of oxygen, NH and sulfur; R is a divalent organic radical containing at least two carbon atoms; $R_1$ and $R_2$ are selected from the group consisting of trivalent aromatic carbocyclic and saturated aliphatic hydrocarbon radicals, (b) at least one organic primary diamine, and (2) curing the product of (1).

4. A dimethyl formamide insoluble imide group polymer obtained by (1) reacting in an essentially polar solvent essentially equimolar amounts of (a) at least one polyanhydride having the general formula

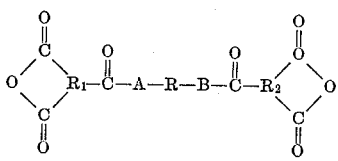

where A is selected from the group consisting of oxygen, NH and sulfur; B is selected from the group consisting of oxygen, NH and sulfur; R is a divalent organic radical containing at least two carbon atoms; $R_1$ and $R_2$ are selected from the group consisting of trivalent aromatic carbocyclic and saturated aliphatic hydrocarbon radicals, (b) at least one organic primary diamine, and (2) curing the product of (1).

5. The dimethyl formamide insoluble imide group reaction product of equal molar parts of p-phenylene-bis-(trimellitate)-dianhydride and benzidine.

6. The dimethyl formamide insoluble imide group reaction product of equal molar parts of p-phenylene-bis-(trimellitate)-dianhydride and 4,4'-diaminodiphenyl ether.

7. The dimethyl formamide insoluble imide group reaction product of equal molar parts of p-phenylene-bis-(trimellitate)-dianhydride and p-phenylene diamine.

8. The dimethyl formamide insoluble imide group reaction product of equal molar parts of p-phenylene-bis- (trimellitate)-dianhydride and 3,3'-dimethoxy-4,4'-diamino biphenyl.

9. The dimethyl formamide insoluble imide group reaction product of equal molar parts of p-phenylene-bis-(trimellitate)-dianhydride and meta-phenylene diamine.

10. The dimethyl formamide insoluble imide group reaction product of equal molar parts of p-phenylene-bis-(trimellitate)-dianhydride and 4,4'-diaminodiphenyl sulfone.

11. The dimethyl formamide insoluble imide group reaction product of equal molar parts of p-phenylene-bis-(trimellitate)-dianhydride and 1,6-diaminohexane.

12. The dimethyl formamide insoluble imide group reaction product of equal molar parts of 2,2-bis-(p-trimellitoxyphenyl)-propane dianhydride and para-phenylene diamine.

13. The dimethyl formamide insoluble imide group reaction product of equal molar parts of p-phenylene-bis-(trimellitate)-dianhydride and ethylene diamine.

14. The dimethyl formamide insoluble imide group reaction product of equal molar parts of 1,2-ethylene-bis-(trimellitate)-dianhydride and para-phenylene diamine.

15. The dimethyl formamide insoluble imide group reaction product of meta-phenylene-bis-(trimellitamide)-dianhydride and para-phenylene diamine.

16. The dimethyl formamide insoluble imide group reaction product of equal molar parts of p-phenylene-bis-(trimellitate)-dianhydride, meta-phenylene diamine and benzidine.

17. The dimethyl formamide insoluble imide group reaction product of equal molar parts of p-phenylene-bis-(trimellitate)-dianhydride and 4,4'-diaminodiphenyl methane.

18. The dimethyl formamide insoluble imide group reaction product of 2,2-bis-(p-trimellitoxyphenyl)-propane dianhydride and 4,4'-diaminodiphenyl ether.

19. The dimethyl formamide insoluble imide group reaction product of equal molar parts of benzidine and 2,2'-bis-(p-trimellitoxyphenyl-)-propane dianhydride.

20. The dimethyl formamide insoluble imide group reaction product of 4,4'-diaminodiphenyl ether, p-phenylene-bis-(trimellitate)-dianhydride and 2,2-bis-(p-trimellitoxyphenyl)-propane dianhydride.

21. The dimethyl formamide insoluble imide group reaction product of 1,4-diamino-2,3,5,6-tetramethyl benzene and p-phenylene-bis-(trimellitate)-dianhydride.

22. The dimethyl formamide insoluble imide group reaction product of p-phenylene-bis-(trimellitate)-dianhydride and 3,5-diamino benzoic acid.

23. The dimethyl formamide insoluble imide group reaction product of equal molar parts of metaphenylene diamine and 4,4'-di-(trimellitoxyphenyl)-sulfone dianhydride.

24. The dimethyl formamide insoluble imide group reaction product of 4,4'-diaminodiphenyl ether and 2,2'-di-(trimellitoxy)-biphenyl dianhydride.

References Cited
UNITED STATES PATENTS 3,179,630   4/1965   Endrey _____ 260—78

WILLIAM H. SHORT, Primary Examiner.

SAMUEL H. BLECH, Examiner.

H. D. ANDERSON, Assistant Examiner.